United States Patent [19]
Kitching et al.

[11] Patent Number: 5,230,094
[45] Date of Patent: Jul. 20, 1993

[54] METHOD AND APPARATUS FOR INTERMEDIATE FREQUENCY SELECTION IN A HETERODYNE RECEIVER

[75] Inventors: Philip A. Kitching, N. Lauderdale; James G. Mittel, Boynton Beach, both of Fla.

[73] Assignee: Motorola, Inc., Schaumburg, Ill.

[21] Appl. No.: 879,397

[22] Filed: May 7, 1992

[51] Int. Cl.[5] .............................................. H04B 1/10
[52] U.S. Cl. .............................. 455/183.2; 455/186.1; 455/296
[58] Field of Search ............... 455/186.1, 183.2, 317, 455/164.2, 62, 208, 183.1, 185.1, 165.1, 296, 310, 260, 76

[56] References Cited

U.S. PATENT DOCUMENTS

| | | | |
|---|---|---|---|
| 4,545,072 | 10/1985 | Skutta et al. | 455/183.2 |
| 4,551,856 | 11/1985 | Victor et al. | 455/183.2 |
| 4,661,995 | 4/1987 | Kashiwagi | 455/183.2 |
| 4,879,758 | 11/1989 | DeLuca et al. | 455/186.1 |
| 5,058,204 | 10/1991 | Tahernia et al. | 455/186.1 |

OTHER PUBLICATIONS

"Integrated Selectivity for Narrow-Band FM IF Systems", by F. Krummenacher & G. Van Ruymbeke, IEEE Journal of Solid-State Circuits, vol. 25, No. 3, Jun. 1990, pp. 757-760.

*Primary Examiner*—Reinhard J. Eisenzopf
*Assistant Examiner*—Nguyen Vo
*Attorney, Agent, or Firm*—Philip P. Macnak; William E. Koch; Thomas G. Berry

[57] ABSTRACT

In a heterodyne receiver having more than one selectable receive frequency and having at least one intermediate frequency circuit (102) capable of operation on at least two intermediate frequencies, a method for selecting one of the at least two intermediate frequencies is shown. The selection method includes selecting (402) one of the more than one selectable receive frequency, and then selecting (408, 410, 504, 506, 510, 512) at least one of the at least two intermediate frequencies for each of the at least one intermediate frequency circuit in response to the selected receive frequency. The selection of the intermediate frequency for each of the at least one intermediate frequency circuit is made such that the selected intermediate frequency does not cause the generation of one or more undesirable spurious frequencies as a result of mixing the selected receive frequency and the selected intermediate frequency.

20 Claims, 6 Drawing Sheets

METHOD AND APPARATUS FOR INTERMEDIATE FREQUENCY SELECTION IN A HETERODYNE RECEIVER

FIELD OF THE INVENTION

This invention relates in general to radio frequency receivers, and more specifically to heterodyne receivers having at least one intermediate frequency circuit.

BACKGROUND OF THE INVENTION

In conventional heterodyne receivers the receive radio frequency (RF) is normally converted to one or more lower intermediate frequencies. The lower intermediate frequencies lend themselves more readily to the amplification and selective filtering required for processing received signals to derive information contained therein. The frequency conversion takes place in converter circuits wherein an input signal having an input frequency is converted to an output intermediate frequency (IF) signal by injecting a mixing signal at a frequency generated by a local oscillator (LO) into the input signal to mix the two signals together within a non-linear device, e.g., a diode. This non-linear mixing process produces various new signals at new frequencies. Examples of such new frequencies are: the sum of the input and LO frequencies, the difference of the input and LO frequencies, twice the sum of the input and LO frequencies, twice the difference of the input and LO frequencies, etc. These new frequencies are well understood by those skilled in the art. Of the various new signals generated, typically only the signal having a frequency equal to the difference of the input and LO frequencies is of interest, because it is the desired output IF signal.

In heterodyne receivers filtering is needed to attenuate unwanted products of the mixing process. One of these unwanted products is "second image." In a dual conversion receiver using "low side" injection and having a second IF of F2, the second image frequency would be 2×F2 below a received carrier frequency. In a dual conversion receiver using "high side" injection and having a second IF of F2 the second image frequency would be 2×F2 above a received carrier frequency. If the second image signal is not attenuated sufficiently by filters, the receiver converts the second image signal to a "base band" frequency that interferes with the desired output signal. The removal of the second image frequency by filter circuits following the IF converter circuits becomes more difficult as F2 becomes smaller, because as F2 becomes smaller, the second image frequency approaches the first IF, F1, which the filter circuit must pass with non-zero bandwidth.

In a battery powered heterodyne receiver, e.g. a portable selective call receiver, low power consumption is of critical importance. In active-selectivity receivers it is possible to reduce power consumption by reducing the value of one or more intermediate frequencies. In the preceding example of a dual conversion receiver, power consumption can be reduced by reducing the second intermediate frequency F2. A limiting factor for the reduction of F2 is the ability of a filter circuit following the first IF converter to remove the undesirable second image frequency 2×F2 below the received carrier, for low side injection, and 2×F2 above the carrier, for high side injection.

Crystal filters normally are used following IF converter circuits, except for those converter circuits having low enough output frequencies to allow the use of solid state filter circuits. The performance of such crystal filters is such that for frequencies below the center frequency of the pass band of the filter, the attenuation of the filter is rapid, smooth, and monotonic. On the other hand, above the center frequency of the pass band of the filter, the attenuation of the filter is much less rapid, not smooth, and not monotonic, requiring approximately five times the incremental frequency change above the center frequency as that required below the center frequency to achieve reliably the same amount of attenuation. For this reason the lower second image frequency produced by low side injection is strongly preferred over the higher second image frequency produced by high side injection. Indeed, in some battery powered receivers having a low second IF it simply is impractical to use high side injection because of the associated filtering difficulties.

If the only consideration affecting the choice of high or low side injection were the best crystal filter performance, the decision would be simple: always use low side injection. Unfortunately, the choice of high or low side injection in conventional receivers is affected by another important phenomenon. That phenomenon is called "receiver self-quieting," a condition that occurs with certain combinations of LO frequencies, due to the mixing of selected harmonics of the LO frequencies. Receiver self-quieting occurs when the mixed LO harmonics result in second image frequencies that fall within the pass band of one or more IF circuits operating within the receiver. These spurious signals overpower a weak received signal, making the receiver insensitive at certain receive frequencies.

An example of a combination that will produce receiver self-quieting follows. Assume a receive frequency of 157.22 MHz, a first IF of 45 MHz, a second IF of 140 KHz, and the use of low side injection throughout. The first LO frequency is (157.22−45.0)=112.220 MHz, and the second LO frequency is (45.0−0.140)=44.860 MHz. The second harmonic of the first LO is 224.440 MHz, and the fifth harmonic of the second LO is 224.300 MHz. When mixed these two frequencies will produce an undesirable signal having a difference frequency of 140 KHz---identical to the second IF.

In conventional receivers it has been common practice to switch from low side injection to high side injection to overcome the problem of receiver self-quieting. Continuing with the preceding example, if the LO is moved to (157.22+45.0)=202.220 MHz (high side injection), then the self quieting problem goes away, because there are no low order harmonics of the two LOs that produce a difference frequency near the second IF.

In battery powered receivers having a low second IF and a crystal filter between first and second IF circuits, it may be impossible to sue high side injection for the reasons discussed previously. This leaves the designers of such receivers without a solution to the receiver self-quieting problem.

Thus, what is needed is a way to prevent receiver self-quieting without requiring the use of high side injection and its associated filtering difficulties.

One aspect of the present invention is a method for selecting an operating second intermediate frequency in a heterodyne receiver having a plurality of predetermined selectable receive frequencies and having first and second intermediate frequency (IF) circuits, the second IF circuit having a passband capable of being centered on at least two predetermined second intermediate frequencies, the first IF circuit being coupled to the second IF circuit for supplying an input signal thereto. The method comprises the steps of (a) selecting one of the plurality of predetermined selectable receive frequencies, and (b) selecting prior to generation of any undesirable spurious frequency one of the at least two predetermined second intermediate frequencies to be the operating second intermediate frequency for the second IF circuit in response to step (a). The operating second intermediate frequency is selected such that substantially all undesirable spurious frequencies generated will fall outside of the passband of the second IF circuit.

Another aspect of the present invention is a heterodyne receiver for receiving radio frequency signals comprising a receive frequency selector for selecting one of a plurality of predetermined selectable receive frequencies to be the operating receive frequency, and a controller coupled to the receive frequency selector for controlling the heterodyne receiver in response to the operating receive frequency selected. The heterodyne receiver further comprises a first intermediate frequency (IF) circuit coupled to the controller for generating a first intermediate frequency, and a second IF circuit coupled to the controller and to the first IF circuit and having a passband capable of being centered on at least two predetermined second intermediate frequencies. The controller comprises a second intermediate frequency selector for selecting prior to generation of any undesirable spurious frequency one of the at least two predetermined second intermediate frequencies to be the operating second intermediate frequency for the second IF circuit. The selected operating second intermediate frequency is such that substantially all undesirable spurious frequencies generated will fall outside of the passband of the second IF circuit.

DESCRIPTION OF A PREFERRED EMBODIMENT

Figure 1:
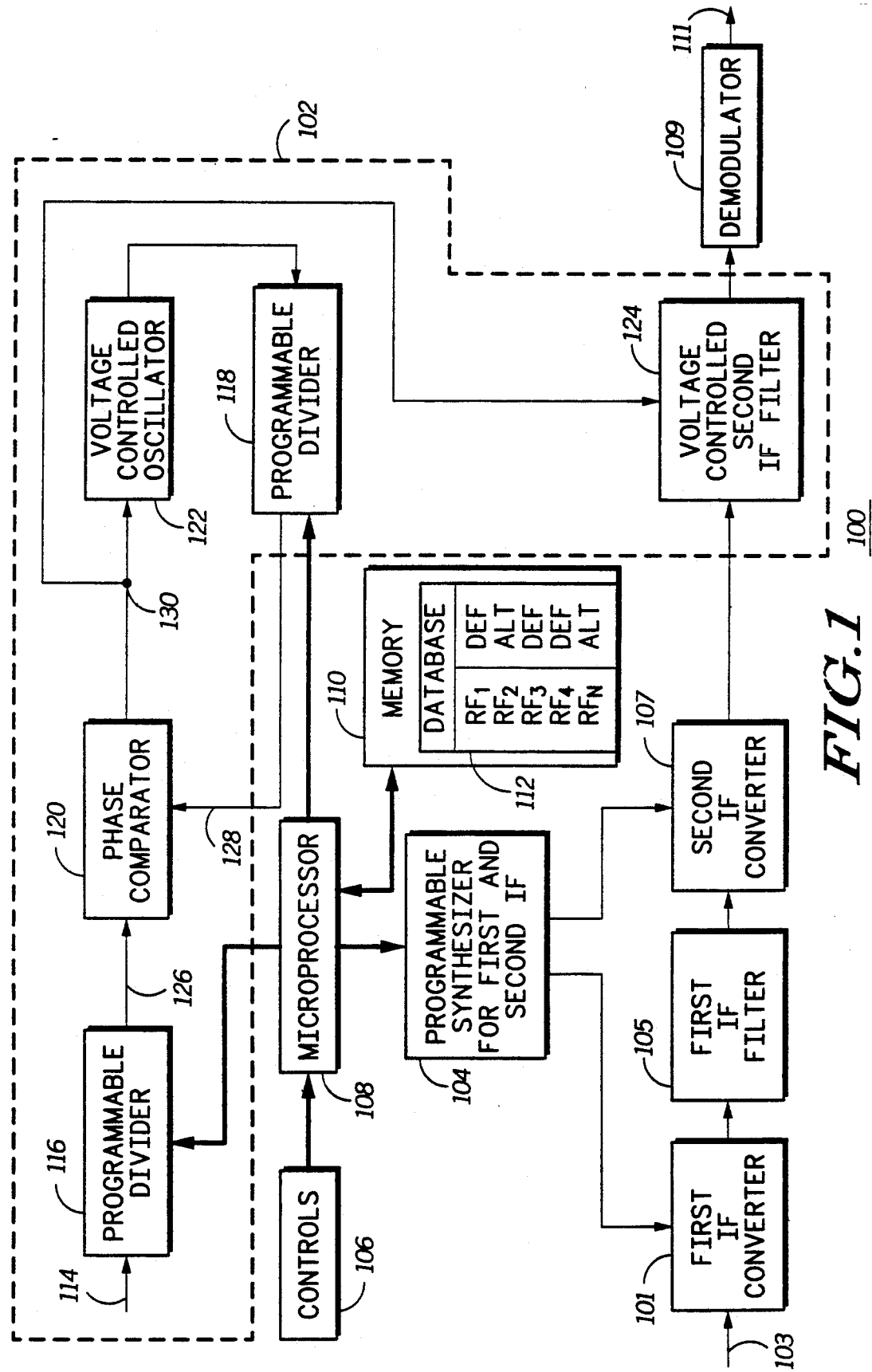
FIG. 1 is a block diagram depicting apparatus for intermediate frequency selection in accordance with a preferred embodiment of the present invention.

With reference to FIG. 1, a block diagram of apparatus 100 for intermediate frequency (IF) selection within a heterodyne receiver in accordance with a preferred embodiment of the present invention. A radio frequency input signal 103 passes through the apparatus 100 comprising a first IF converter 101, a first IF filter 105, a second IF converter 107, a programmable second IF filter 102, and a demodulator 109. The purpose of the apparatus 100 is to amplify the received radio frequency input signal 103 and to selectively filter and demodulate the received radio frequency input signal 103 to recover information contained therein. The programmable second IF filter 102 is capable of operation on at least two preprogrammed IF operating frequencies. The apparatus 100 further comprises a programmable synthesizer 104 capable of generating at least two preprogrammed second IF local oscillator (LO) frequencies compatible with the at least two preprogrammed IF operating frequencies. Programmable synthesizers like the programmable synthesizer 104 are well known in the art, an example being the programmable synthesizer currently shipping in a Motorola selective call receiver designated A03BPC5911AA, manufactured by Motorola, Inc. of Schaumburg, Ill. The programmable synthesizer 104 generates a local oscillator signal at a first frequency for the first IF converter 101 coupled between the radio frequency input signal 103 and the first IF filter 105. The programmable synthesizer 104 also generates a LO signal at a second frequency for the second IF converter 107 coupled between the first IF filter 105 and the programmable second IF filter 102. The programmable second IF filter 102 is coupled to the demodulator 109 that provides a receiver output signal on an output line 111.

The apparatus 100 also includes controls 106 for user selection of a receive frequency, and a memory 110 comprising a preprogrammed database 112 comprising possible receive frequencies ($RF_1$, $RF_2$, $RF_3$, $RF_4$, ... $RF_N$) in combination with one of two preprogrammed second IF values. The preprogrammed second IF value is a first "default" (DEF) IF value if the combined receive frequency and default IF do not produce a spurious self-quieting frequency. The preprogrammed second IF value is a second "alternate" (ALT) IF value if the combined receive frequency and default IF do produce a spurious self-quieting frequency. The IF filter 102, the programmable synthesizer 104, the controls 106, and the memory 110 are all coupled to a microprocessor 108, which interacts with and controls these elements in a manner that is described in subsequent paragraphs.

The programmable IF filter 102 functions to remove undesirable frequencies present in the output of the second IF converter 107 and is controlled by the microprocessor 108 to operate on either of two preselected center frequencies. The programmable IF filter 102 receives a reference clock signal on a line 114. The signal on the line 114 is divided by a first programmable divider 116 to produce a signal on a first input line 126 of a phase comparator 120 at a frequency determined by a value programmed into the first programmable divider 116 by the microprocessor 108. Phase comparators like the phase comparator 120 are well known in the art, an example being the Motorola integrated circuit (IC) designated MC4044, manufactured by Motorola, Inc. of Schaumburg, Ill. A second programmable divider 118 receives an input signal from a voltage controlled oscillator (VCO) 122. Programmable dividers like the programmable dividers 116, 118 are well known in the art, an example being the Motorola IC designated MC4016, manufactured by Motorola, Inc. of Schaumburg, Ill. The input signal from the VCO 122 is divided by the second programmable divider 118 to produce a signal on a second input line 128 of the phase comparator 120 at a frequency determined by a value programmed into the second programmable divider 118 by the microprocessor 108. Voltage controlled oscillators like the VCO 122 are well known in the art, an example being the Motorola IC designated MC1658, manufactured by Motorola, Inc. of Schaumburg, Ill. The output of the phase comparator 120 produces a control voltage at a node 130 that controls both the output frequency of the VCO 122 and the center frequency of a voltage controlled second IF filter 124. Voltage controlled IF filters like the voltage controlled second IF filter 124 have recently become known in the art, an example being the IF filter described in an article entitled "Integrated Selectivity for Narrow-Band FM IF Systems," by F. Krummenacher and G. Van Ruymbeke, which appeared in the *IEEE Journal of Solid-State Circuits,* Vol. 25, No. 3, June 1990, on pages 757–760.

The VCO 122, the second programmable divider 118, the phase comparator 120 and the signal on the first input line 126 comprise a phase-locked loop wherein the VCO control voltage at the node 130 is forced to a value such that the VCO output frequency, divided by the second programmable divider 118, produces a signal on the second input line 128 that is identical in frequency and phase to the signal on the first input line 126. In addition, because the VCO 122 is constructed using resonators similar to those used for the voltage controlled second IF filter 124, and ideally built on the same piece of fabricated silicon, the center frequency of the voltage controlled second IF filter 124 closely matches the output frequency of the VCO 122. Because the microprocessor 108 controls and programs the first and second programmable dividers 116, 118, it follows that the microprocessor also controls and programs the frequency of the VCO 122, and hence the center frequency of the voltage controlled second IF filter 124.

In view of the preceding discussion, it should be clear that the apparatus 100 for intermediate frequency (IF) selection within a heterodyne receiver in accordance with a preferred embodiment of the present invention comprises a superior apparatus that is especially desirable for battery powered receivers. In such receivers it is of critical importance to achieve the lowest possible power consumption compatible with desired receiver performance. The use of a low second IF is an excellent way of reducing power consumption while maintaining performance, but, for reasons discussed previously, a low second IF makes it impossible to use high side injection without incurring severe filtering problems. Before the present invention, the designers of receivers that utilized a low second IF were left with no solution to the self-quieting problem, because of the inability to use high side injection when needed. The preferred embodiment, apparatus 100, prevents receiver self-quieting without requiring the high side injection and its associated filtering difficulties, and thus makes it possible to build a superior low power heterodyne receiver.

Figure 2:
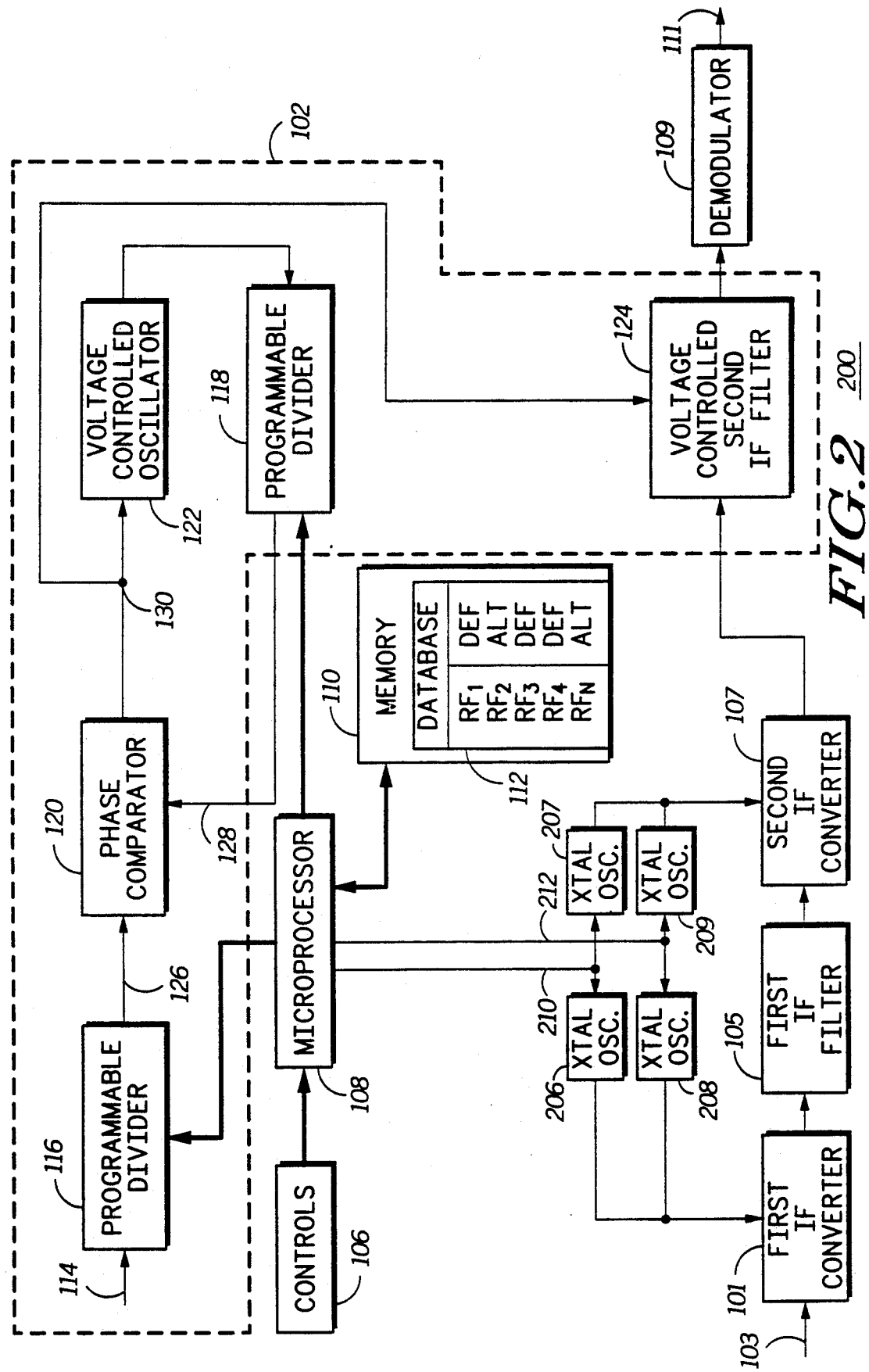
FIG. 2 is a first alternate embodiment of apparatus for intermediate frequency selection in accordance with the present invention.

With reference to FIG. 2, a first alternate embodiment of the present invention is shown as apparatus 200. The essential difference between the apparatus 200 and the apparatus 100 is that the apparatus 200 comprises first and second select lines 210, 212 that are controlled by the microprocessor 108. The first and second select lines 210, 212 uniquely select one of two first IF local crystal oscillators 206, 208 coupled to the first IF converter 101, and one of two second IF local crystal oscillators 207, 209, respectively, coupled to the second IF converter 107 in accordance with the present invention.

The advantage of the apparatus 200 is that it allows an embodiment of the present invention to be used in a receiver that employs crystal oscillators instead of a frequency synthesizer for generating its LO signals.

Figure 3:
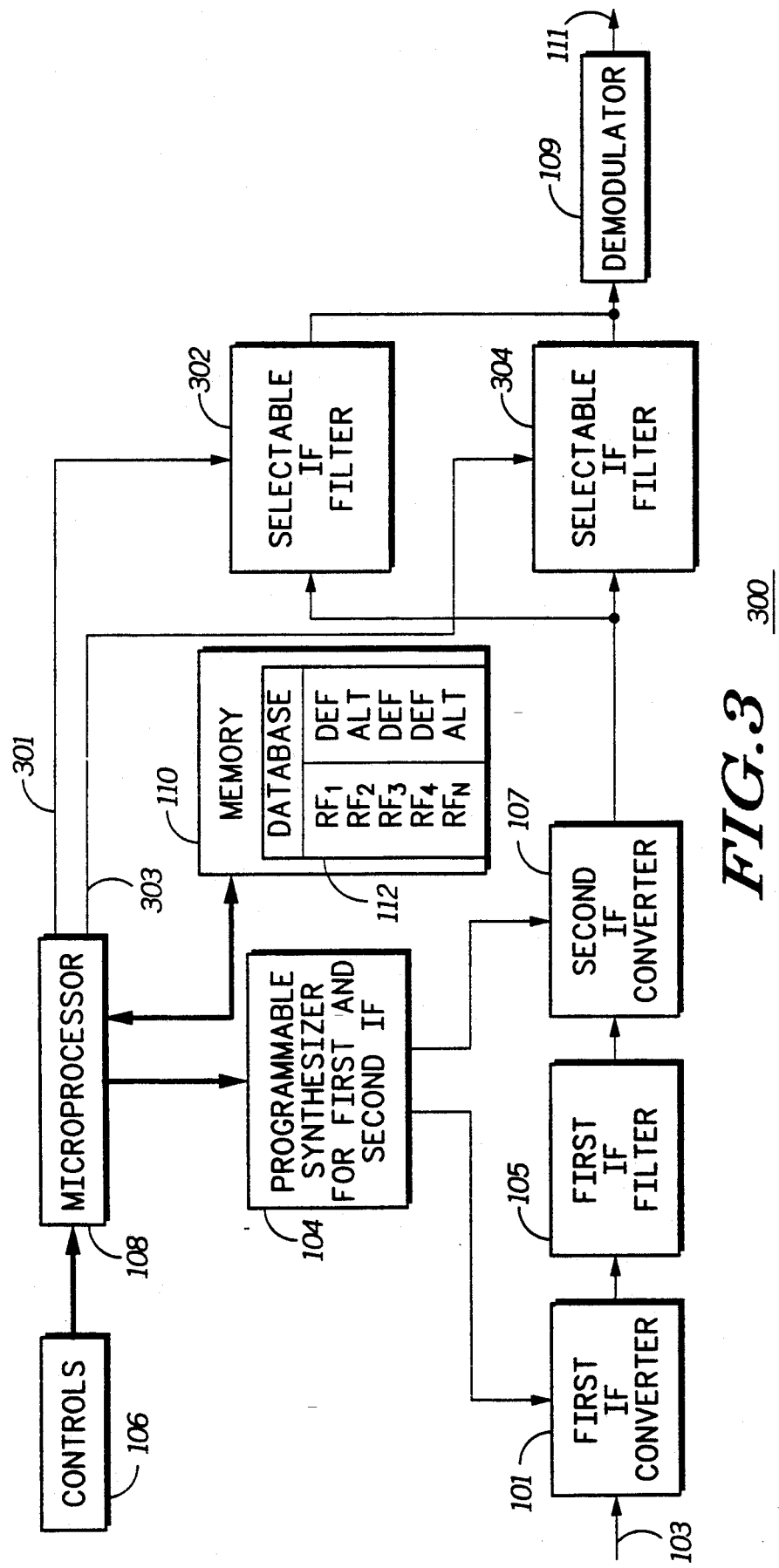
FIG. 3 is a second alternate embodiment of apparatus for intermediate frequency selection in accordance with the present invention.

With reference to FIG. 3, a second alternate embodiment, apparatus 300, is shown, the essential difference between the apparatus 300 and the apparatus 100 being that the apparatus 300 comprises first and second select lines 301, 303 that are controlled by the microprocessor 108. The first and second select lines 301, 303 select uniquely one of two selectable IF filters 302, 304, respectively, coupled between the second IF converter 107 and the demodulator 109 in accordance with the present invention.

The advantage of the apparatus 300 is that it allows an embodiment of the present invention to be used in a receiver that employs two different second IF filters having fixed IFs instead of a programmable IF filter.

Figure 4:
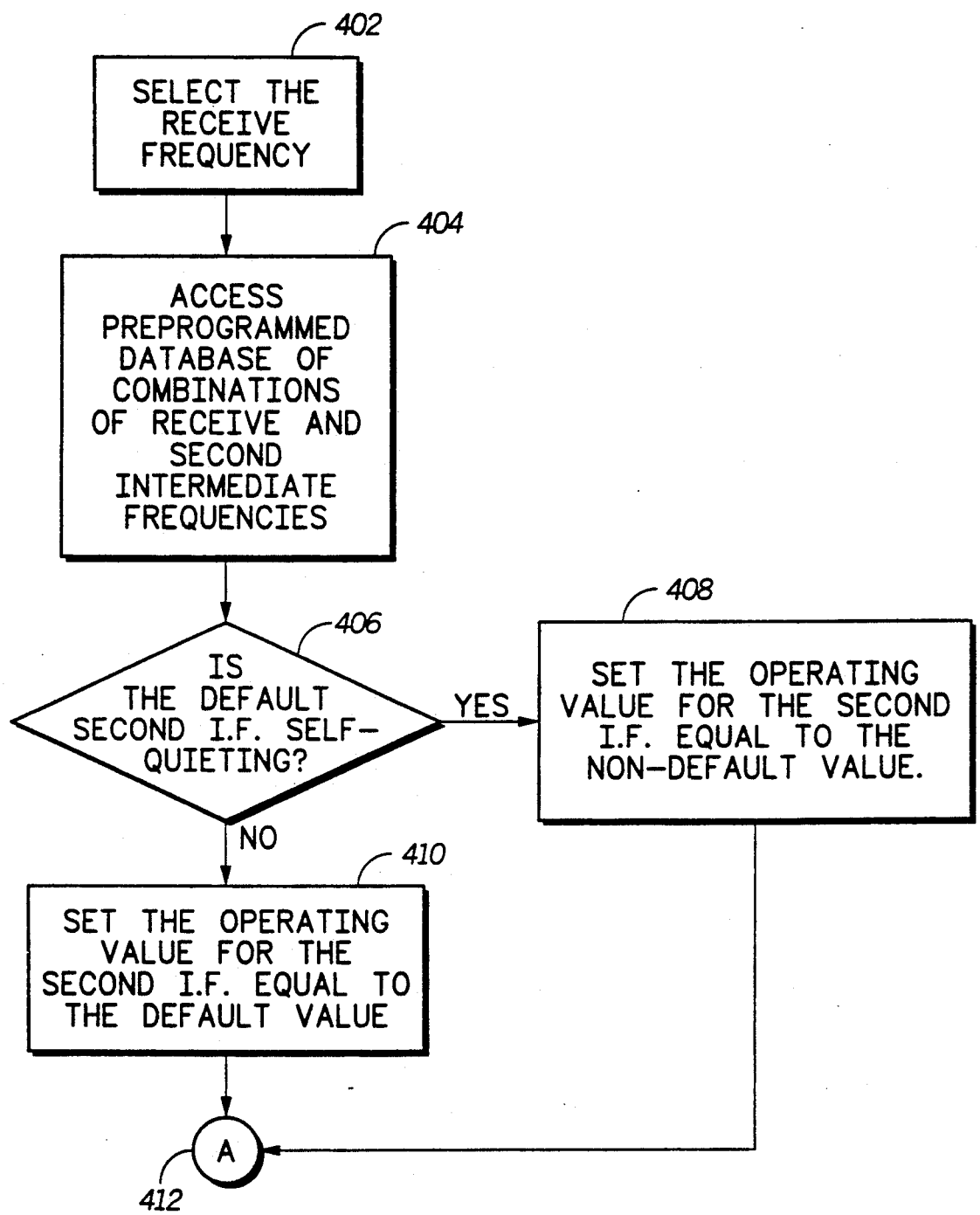
FIGS. 4 and 5 are a flow chart depicting a method of intermediate frequency selection in accordance with the present invention.
Figure 5:
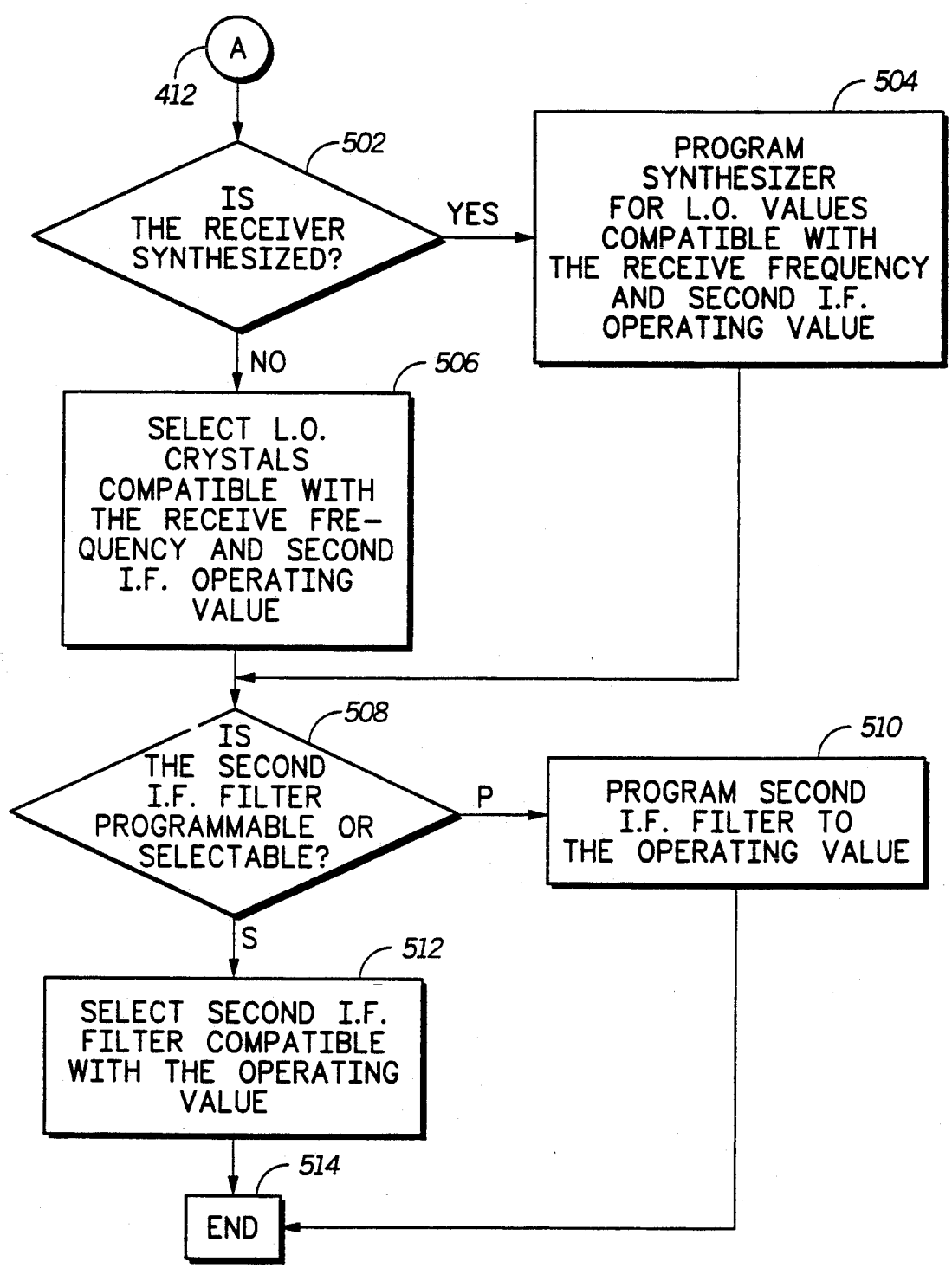

With reference to FIG. 4 and FIG. 5, a method of IF selection for a dual conversion heterodyne receiver according to the present invention is shown that prevents self-quieting without requiring the use of high side injection and the associated filtering difficulties. The method begins when an operator selects a receive frequency for the receiver by means of the controls 106 (FIG. 1) in a step 402. This action causes the microprocessor 108 to execute a step 404 of accessing the preprogrammed database 112 wherein there are contained combinations of possible receive frequency and second IF, along with values indicating whether each combination produces a spurious frequency that causes self-quieting. From the information contained in the database 112 the microprocessor 108 next executes a step 406 of determining whether a preprogrammed "default" second IF for the receiver is unusable because of the associated self-quieting. If so, the microprocessor 108 executes a step 408, setting the operating value for the second IF equal to a preprogrammed value different from the default value, and then proceeds to a point 412 and on to FIG. 5. If the preprogrammed default second IF for the receiver is usable, then the microprocessor executes a step 410 setting the operating value for the second IF equal to the preprogrammed default value and then proceeds to the point 412 and on to FIG. 5.

From the point 412 a determination is made in step 502 concerning whether the receiver is synthesized. If so, the microprocessor executes a step 504 programming the programmable synthesizer 104 for the first and second local oscillator values compatible with the receive frequency and the second IF operating value set previously. Signals at frequencies determined by the first and second LO values are then sent by the programmable synthesizer 104 to the first and second IF converters 101, 107, respectively. If the heterodyne receiver is not synthesized (FIG. 2), the microprocessor executes a step 506 selecting one of the two first IF local crystal oscillators 206, 208 to drive the first IF converter 101, and one of the two second IF local crystal oscillators 207, 209 to drive the second IF converter. The microprocessor makes the selection by controlling the first and second select lines 210, 212 (FIG. 2).

Next a determination is made in step 508 concerning whether the second IF filter is programmable or is selectable. If programmable (FIG. 1 and FIG. 2), the microprocessor programs the second the second IF filter to work at the previously determined operating value. If the second IF filter is selectable (FIG. 3), the microprocessor selects one of the two IF filters 302, 304 compatible with the previously determined operating value. The microprocessor makes the selection by controlling the first and second select lines 301, 303 (FIG. 3). The selection method then ends at a step 514, the method having selected a receive frequency and first and second LO frequencies, and a second IF filter frequency compatible with the selected receive frequency and with the prevention of receiver self-quieting.

In view of the preceding discussion, it should be clear that the preceding embodiments of a method of IF selection for a dual conversion heterodyne receiver according to the present invention comprise a superior method that is especially desirable for battery powered receivers. In such receivers it is of critical importance to achieve the lowest possible power consumption compatible with desired receiver performance. Before the present invention, the designers of receivers that utilized a low second IF were left with no solution to the self-quieting problem, because of the inability to use high side injection when needed. The present invention provides a method of preventing receiver self-quieting without requiring the high side injection and its associated filtering difficulties, and thus makes it possible to design a superior low power heterodyne receiver.

Figure 6:
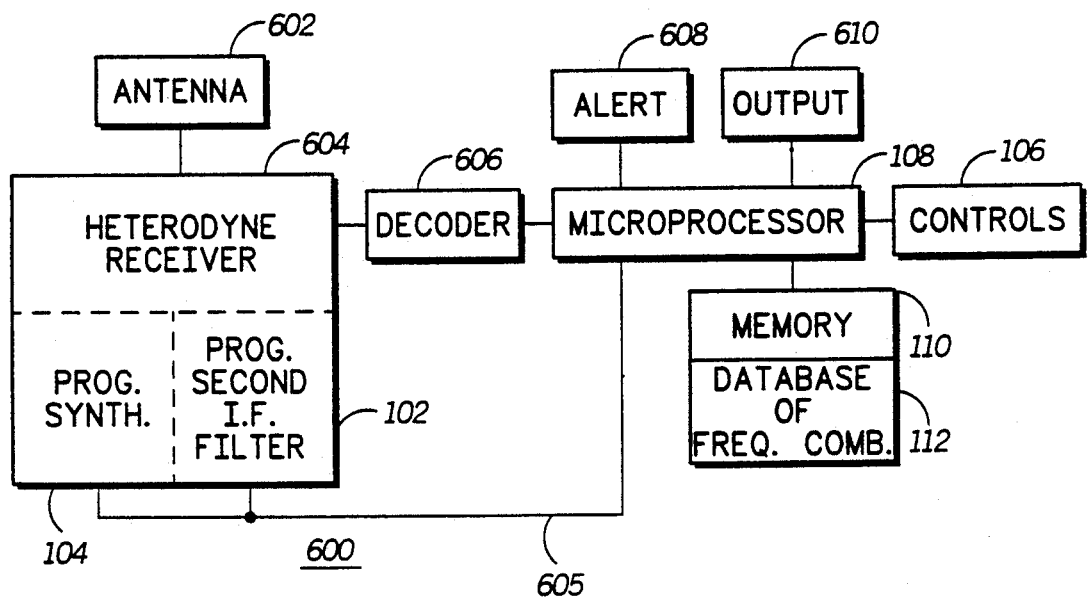
FIG. 6 is a block diagram of a selective call receiver in accordance with the preferred embodiment of the present invention.

With reference to FIG. 6, a selective call receiver 600 in accordance with the preferred embodiment according to the present invention comprises an antenna 602 for accepting RF signals comprising information. The antenna 602 is coupled to a heterodyne receiver 604 for receiving the RF signals accepted. The heterodyne receiver 604 comprises the programmable synthesizer 104 (FIG. 1) and the programmable second IF filter 102 (FIG. 1) for selecting operating frequencies in accordance with an embodiment of the present invention. A control bus 605 couples the programmable synthesizer 104 and the programmable second IF filter 102 to the microprocessor 108 (FIG. 1) for controlling the frequency selection process. A decoder 606 is coupled to the heterodyne receiver 604 for decoding the received information. The microprocessor 108 receives the decoded received information from the decoder 606 and processes the information to recover messages. The microprocessor 108 is coupled to and controls the memory 110 (FIG. 1) for storing and recalling the messages received. The memory also comprises the preprogrammed database 112 (FIG. 1), and the microprocessor 108 controls access to the preprogrammed database 112 in accordance with the preferred embodiment of the present invention. An alert device 608 provides an audible or tactile alert to the user when the microprocessor 108 has a message ready for presentation. There is an output device 610 comprising a visual display or a speaker, the output device also being controlled by the microprocessor 108. The controls 106 (FIG. 1) comprise user accessible interfaces for allowing the user to command the microprocessor 108 to select a receive frequency and to perform other selective call receiver operations well known to those skilled in the art, and typically include control switches such as an on/off control button, a function control, and so forth.

In view of the preceding discussion, it should now be clear that the preferred embodiment of a heterodyne receiver according to the present invention comprises a superior design method that is especially desirable for battery powered receivers. In such receivers it is of critical importance to achieve the lowest possible power consumption compatible with desired receiver performance. The use of a low second IF is an excellent way of reducing power consumption while maintaining performance, but, for reasons discussed previously, a low second IF makes it impossible to use high side injection without incurring severe filtering problems. Before the present invention, the designers of receivers that utilized a low second IF were left with no solution to the self-quieting problem, because of the inability to use high side injection when needed. The present invention provides a method of preventing receiver self-quieting without requiring the high side injection and its associated filtering difficulties, and thus makes it possible to design a superior low power heterodyne receiver.

We claim:

1. In a heterodyne receiver having a plurality of predetermined selectable receive frequencies and having first and second intermediate frequency (IF) circuits, the second IF circuit having a passband capable of being centered on at least two predetermined second intermediate frequencies, the first IF circuit being coupled to the second IF circuit for supplying an input signal thereto, a method of selecting an operating second intermediate frequency, comprising the steps of:
   (a) selecting one of the plurality of predetermined selectable receive frequencies; and
   (b) selecting prior to generation of any undesirable spurious frequency one of the at least two predetermined second intermediate frequencies to be the operating second intermediate frequency for the second IF circuit in response to step (a), wherein the operating second intermediate frequency is selected such that substantially all undesirable spurious frequencies generated will fall outside of the passband of the second IF circuit.

2. The method according to claim 1 further comprising the step of (c) generating an operating first intermediate frequency for the first IF circuit only by low-side injection.

3. The method according to claim 1 further comprising the step of (d) programming a programmable frequency generator in response to steps (a) and (b).

4. The method according to claim 1 further comprising the step of (e) selecting a frequency determining device in response to steps (a) and (b).

5. The method according to claim 1 further comprising the step of (f) programming the operating frequency of a programmable filter circuit in response to steps (a) and (b).

6. The method according to claim 1, further comprising the step of (g) selecting a filter circuit in response to steps of (a) and (b).

7. The method according to claim 1 further comprising the step of (h) pre-programming a database with a plurality of first values and a plurality of corresponding second values, each first value defining one of the plurality of predetermined selectable receive frequencies and each second value defining one of the at least two predetermined second intermediate frequencies, the second value selected such that substantially all undesirable spurious frequencies generated will fall outside of the passband of the second IF circuit, and
   wherein step (b) comprises the steps of:
      (i) searching the plurality of first values to locate a first value that matches the operating receive frequency; and
      (j) using the corresponding second value to define the operating second intermediate frequency for the second IF circuit, and
   wherein the method further comprises the step of (k) controlling the second IF circuit to operate on the operating second intermediate frequency defined in step (j).

8. The method according to claim 7 wherein step (i) comprises the step of (l) programming at least one programmable frequency generator.

9. The method according to claim 7 wherein step (i) comprises the step of (m) programming the operating frequency of at least one programmable filter circuit.

10. A heterodyne receiver for receiving radio frequency signals comprising:

receive frequency selection means for selecting one of a plurality of predetermined selectable receive frequencies to be the operating receive frequency;

controller means coupled to the receive frequency selection means for controlling the heterodyne receiver in response to the operating receive frequency selected;

first intermediate frequency (IF) circuit means coupled to the controller means for generating a first intermediate frequency; and second IF circuit means coupled to the controller means and to the first IF circuit means and having a passband capable of being centered on at least two predetermined second intermediate frequencies, wherein the controller means comprises second intermediate frequency selection means for selecting prior to generation of any undesirable spurious frequency one of the at least two predetermined second intermediate frequencies to be the operating second intermediate frequency for the second IF circuit means, and wherein the selected operating second intermediate frequency is such that substantially all undesirable spurious frequencies generated will fall outside of the passband of the second IF circuit means.

11. The heterodyne receiver according to claim 10, wherein the controller means further comprises memory means including a pre-programmed database, and wherein the pre-programmed database comprises a plurality of first values and a plurality of corresponding second values, each first value defining one of the plurality of predetermined selectable receive frequencies, and each second value defining one of the at least two predetermined second intermediate frequencies, and wherein the second intermediate frequency selection means comprises a processor element for searching the plurality of first values to locate a first value that matches the operating receive frequency, and for using the corresponding second value to define the operating second intermediate frequency for the second IF circuit means.

12. The heterodyne receiver according to claim 6, wherein the second IF circuit means comprises a programmable frequency generator.

13. The heterodyne receiver according to claim 6, wherein the second IF circuit means comprises a selectable frequency determining device.

14. The heterodyne receiver according to claim 10, wherein the second IF circuit means comprises a programmable second intermediate frequency filter circuit.

15. A selective call receiver comprising:

an antenna for accepting radio frequency (RF) signals comprising selective call information;

a heterodyne receiver coupled to the antenna for receiving the RF signals comprising information and for demodulating the RF signals comprising information and for demodulating the RF signals to derive the information, the heterodyne receiver comprising:

a receive frequency selector for selecting one of a plurality of predetermined selectable receive frequencies to be the operating receive frequency;

a first intermediate frequency (IF) circuit for generating a first intermediate frequency; and a second IF circuit coupled to the receive frequency selector and to the first IF circuit, the second IF circuit having a passband capable of being centered on at least two predetermined second intermediate frequencies; and a controller coupled to the receive frequency selector and to the first and second IF circuits for controlling the heterodyne receiver in response to the operating receive frequency selected, wherein the controller comprises a second intermediate frequency selector for selecting prior to generation of any undesirable spurious frequency one of the at least two predetermined second intermediate frequencies to be the operating second intermediate frequency for the second IF circuit, and wherein the selected operation second intermediate frequency is such that substantially all undesirable spurious frequencies generated will fall outside of the passband of the second IF circuit.

16. The selective call receiver according to claim 15, wherein the controller further comprises a memory including a preprogrammed database, and wherein the pre-programmed database comprises a plurality of first values and a plurality of corresponding second values, each first value defining one of the plurality of predetermined selectable receive frequencies, and each second value defining one of the at least two predetermined second intermediate frequencies, and wherein the second intermediate frequency selector comprises a processor element for searching the plurality of first values to locate a first value that matches the operating receive frequency, and for using the corresponding second value to define the operating second intermediate frequency for the second IF circuit.

17. The selective call receiver according to claim 15, wherein the second IF circuit comprises a programmable frequency generator.

18. The selective call receiver according to claim 15, wherein the second IF circuit comprises a programmable second intermediate frequency filter circuit.

19. The heterodyne receiver according to claim 10, wherein the first IF circuit means generates the first intermediate frequency only by low-side injection.

20. The selective call receiver according to claim 15, wherein the first IF circuit generates the first intermediate frequency only by low-side injection.

* * * * *